United States Patent [19]

Lee et al.

[11] Patent Number: 5,699,339
[45] Date of Patent: Dec. 16, 1997

[54] INVERSE IMAGE GENERATING METHOD APPARATUS THEREOF AND FOCUS ERROR DETECTING METHOD USING THE SAME AND APPARATUS THEREOF

[75] Inventors: Chul-woo Lee, Seoul; Chong-sam Chung, Sungnam; Jang-hoon Yoo; Kyung-hwa Rim, both of Seoul, all of Rep. of Korea

[73] Assignee: Samsung Electronics Co., Ltd., Suwon, Rep. of Korea

[21] Appl. No.: 508,253

[22] Filed: Jul. 27, 1995

[30] Foreign Application Priority Data

Oct. 26, 1994 [KR] Rep. of Korea ............. 94-27498

[51] Int. Cl.$^6$ ......................................... G11B 7/00
[52] U.S. Cl. ................. 369/112; 369/44.23; 369/110; 359/834
[58] Field of Search ................. 369/112, 110, 369/13, 44.23, 44.14; 359/831, 833, 834, 837, 487, 494, 495, 496

[56] References Cited

U.S. PATENT DOCUMENTS

| | | |
|---|---|---|
| 4,170,401 | 10/1979 | Yoder, Jr. et al. ............. 359/487 |
| 5,132,950 | 7/1992 | Sato et al. ............. 369/112 X |
| 5,446,710 | 8/1995 | Gardner et al. ............. 369/112 X |
| 5,488,598 | 1/1996 | Endo et al. ............. 369/44.23 X |
| 5,504,619 | 4/1996 | Okazaki ............. 359/495 |

OTHER PUBLICATIONS

Malacara, Daniel "Optical Shop Testing" 1978, pp. 105–149.

*Primary Examiner*—Thang V. Tran
*Attorney, Agent, or Firm*—Burns, Doane, Swecker & Mathis, L.L.P.

[57] ABSTRACT

In detecting a focus error for an optical pickup, an inverse image generator for generating inverse images onto a light beam reflected from an optical disk is used in a focus error detecting method and apparatus thereof. The inverse image generator is composed of a semi-transmissive plane for splitting a light beam into first and second light beams, first and second prisms for inverting the phase of the second light beam, and third and fourth prisms for synthesizing the phase-inverted second light beam with the first light beam. Also, the inverse image generator has two quadrant wave plates, a polarization plane and light synthesizing plane for preventing a light loss. Since the errors due to an optical axis variation is eliminated from the focus error signal detected from the synthetic light beam radiated by the inverse generator, the optical pickup can be driven with stability.

20 Claims, 4 Drawing Sheets

INVERSE IMAGE GENERATING METHOD APPARATUS THEREOF AND FOCUS ERROR DETECTING METHOD USING THE SAME AND APPARATUS THEREOF

BACKGROUND OF THE INVENTION

1) Field of the Invention

The present invention relates to an inverse image generating method for generating a synthetic light beam having two mutually inverse image components. The method is applied in an optical pickup for recording and/or reproducing information by optically scanning a recording medium. Specifically, the present invention relates to an inverse image generator, a focus error detecting method for detecting a signal representing a magnitude of a focus error of an objective lens with respect to the recording medium using the same, and the apparatus thereof. More particularly, the present invention relates to an inverse generating method for eliminating errors of a detected signal due to the optical axis variation depending on the tilt of a recording medium or shift of an objective lens, an inverse image generator, a focus error detecting method using the same and apparatus thereof.

2) Discussion of Related Art

In detecting focus errors, there is a well-known method, a so-called "critical angle method" using a critical angle prism. FIG. 1 shows an example of an optical pickup adopting a focus error detector based on a conventional critical angle method.

In FIG. 1, reference numeral 1 is a light source such as a laser diode. The light radiated from the light source 1 is collimated by means of a collimating lens 2 and then passes through a beam splitter 3. An objective lens 4 focuses the incident light passing through beam splitter 3 onto an optical disk 5 which is a recording medium. The reflected light from an optical disk 5 passes through objective lens 4 again and is collimated to then travel toward beam splitter 3. A critical angle prism 6 is installed along the reflection path of beam splitter 3. That is, light beams partially reflected from beam splitter 3 and partially reflected from a critical reflecting plane of critical angle prism 6 is received by a bi-segmented photo-detector 7.

Here, if optical disk 5 is positioned on the focal plane of objective lens 4, the reflected light incident into critical angle prism 6 are collimated and is totally reflected from the critical reflection plane 6a, to then be equally divided and received by two sections 7a and 7b of bi-segmented photo-detector 7, as shown in FIG. 2A. At this time, the signal value of a differential amplifier 8 becomes zero.

However, if optical disk 5 deviates from the focal plane of objective lens 4, the reflected light converges or diverges as necessary and an incident angle of the reflected light becomes smaller than a critical angle in view of an optical axis to then be transmitted through the critical reflection plane 6a, as shown in FIG. 2B or 2C. Therefore, in this case, the reflected light is received by either the two sections, i.e., 7a or 7b. The output signal of differential amplifier 8 becomes a positive or negative value, i.e., it is not zero.

However, according to the conventional critical angle method, even if the optical axis variation is generated due to the tilt of optical disk or shift of objective lens, the spot on photo-detector 7 is moved. Thus, even if an optical disk is exactly positioned on the focal plane of objective lens, the detected focus error signal is not zero. Due to such a problem, the conventional optical pickup makes it difficult to attain stable servo operation. Also, desired information cannot be recorded and reproduced properly.

SUMMARY OF THE INVENTION

Therefore, it is an object of the present invention to provide an inverse image generating method for generating a synthetic light beam having two mutually inverse image components from the reflected light of an optical disk so as to offset signal errors produced by an optical axis variation due to the tilt of the optical disk or shift of an objective lens, and an inverse image generator.

It is another object of the present invention to provide a focus error detecting method for detecting a stable signal from which errors due to an optical axis variation are eliminated using the inverse generator, and apparatus thereof.

To accomplish the first object, there is provided an inverse image generating method for generating a synthetic light beam having two mutually inverse image components from a light beam according to the present invention, the method comprising the steps of: splitting the light beam into two beams by partially transmitting and reflecting the same; inverting the phases of the two beams by reflecting one beam at least twice so as to travel in parallel with the other; and radiating the synthetic light beam by performing a process for uniting the phase-inverted light beam with the other light beam into one light axis.

Also, to accomplish the first object, the inverse image generator according to the present invention for generating a synthetic light beam having two mutually inverse image components from a light beam comprises: splitting means having an incident plane onto which the light beam is incident and a radiating plane from which the synthetic light beam is radiated for partially transmitting and reflecting the light beam and then splitting into first and second light beams; inverting means for inverting phases of the first and second light beams by reflecting one beam at least twice so as to travel in parallel with the other; and synthesizing means for synthesizing the phase-inverted one light beam for radiating the synthetic light beam with the other light beam so as to be united into one light axis.

Meanwhile, to accomplish the second object, there is provided a focus error detecting method according to the present invention for detecting a signal representing a magnitude of the focus error of an objective lens with respect to an optical disk from the reflecting light for reflecting the optical disk after being focused onto the optical disk by means of the objective lens, the method comprising the step of generating a synthetic light beam having two mutually inverse image components from the reflected light, whereby the signal is detected from the synthetic light beam.

Also, to accomplish the second object, the inverse image generator according to the present invention for detecting a signal representing a magnitude of the focus error of an objective lens with respect to an optical disk from the reflecting light for reflecting the optical disk after being focused onto the optical disk by means of the objective lens, comprises inverse image generating means for generating a synthetic light beam having two mutually inverse image components from the reflected light, whereby the signal is detected from the synthetic light beam.

According to the present invention, during an optical axis variation, the two mutually inverse image components of the synthetic light beam move with respect to the optical axis variation in the reverse direction to each other, which is detected by a bi-segmented photo-detector and differential amplifier, accordingly, thereby enabling the elimination of the signal error based on the optical axis variation.

BRIEF DESCRIPTION OF THE DRAWINGS

The above objects and advantages of the present invention will become more apparent by describing in detail a preferred embodiment thereof with reference to the attached drawings in which:

FIGS. 2A to 2C illustrate the principle of detecting a focus error in the conventional focus detector shown in FIG. 1, in which FIG. 2A is a partial schematic view for the case when an optical disk is positioned on the focal plane of an objective lens, FIG. 2B is a partial schematic view for the case when an optical disk is positioned on the near side of focal plane of an objective lens, and FIG. 2C is a partial schematic view for the case when an optical disk is positioned on the farther side of focal plane of an objective lens;

DETAILED DESCRIPTION OF THE INVENTION

Figure 1:
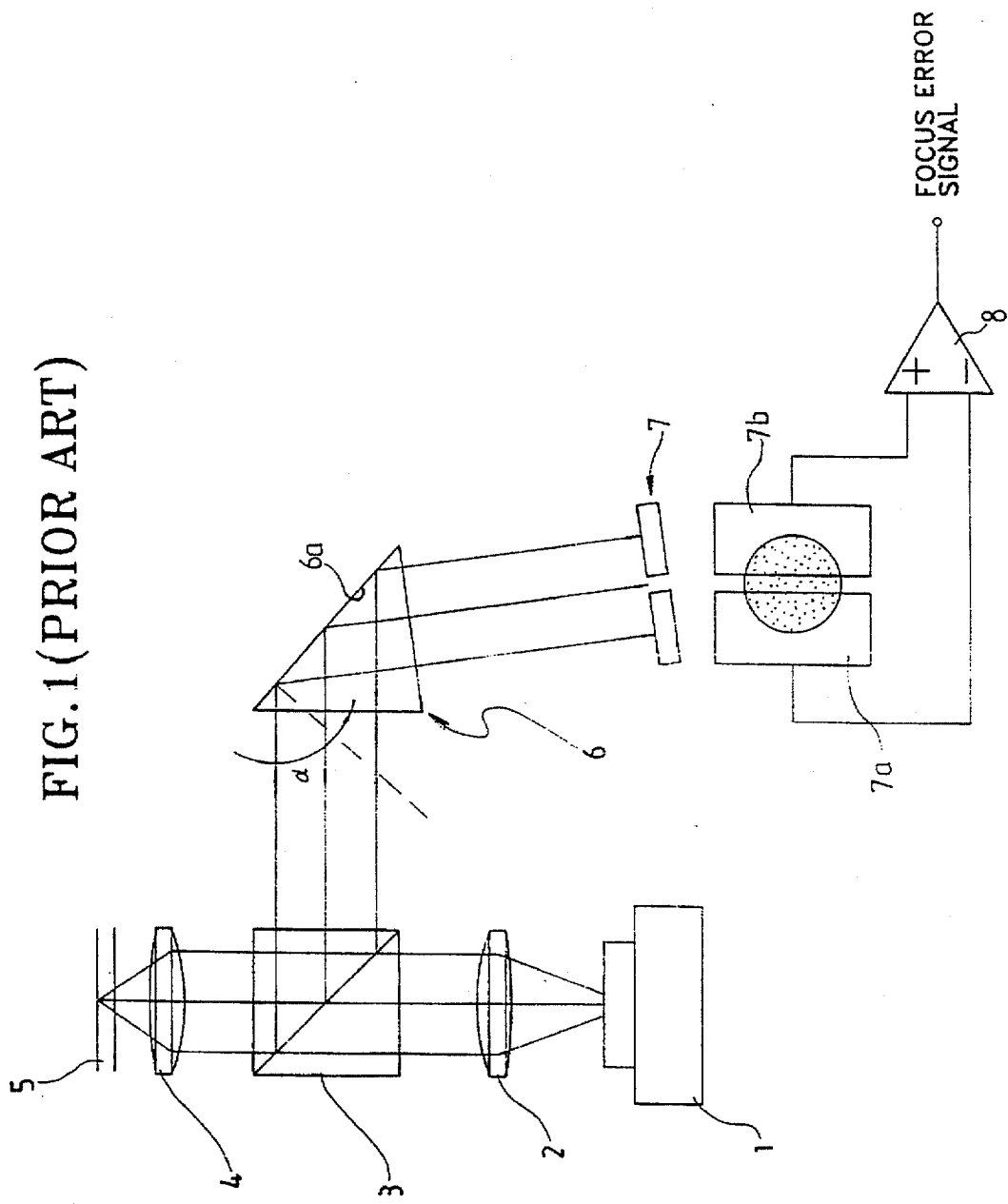
FIG. 1 is a schematic view showing the optical construction of an optical pickup adopting a focus error detector based on a conventional critical angle method.
Figure 2:
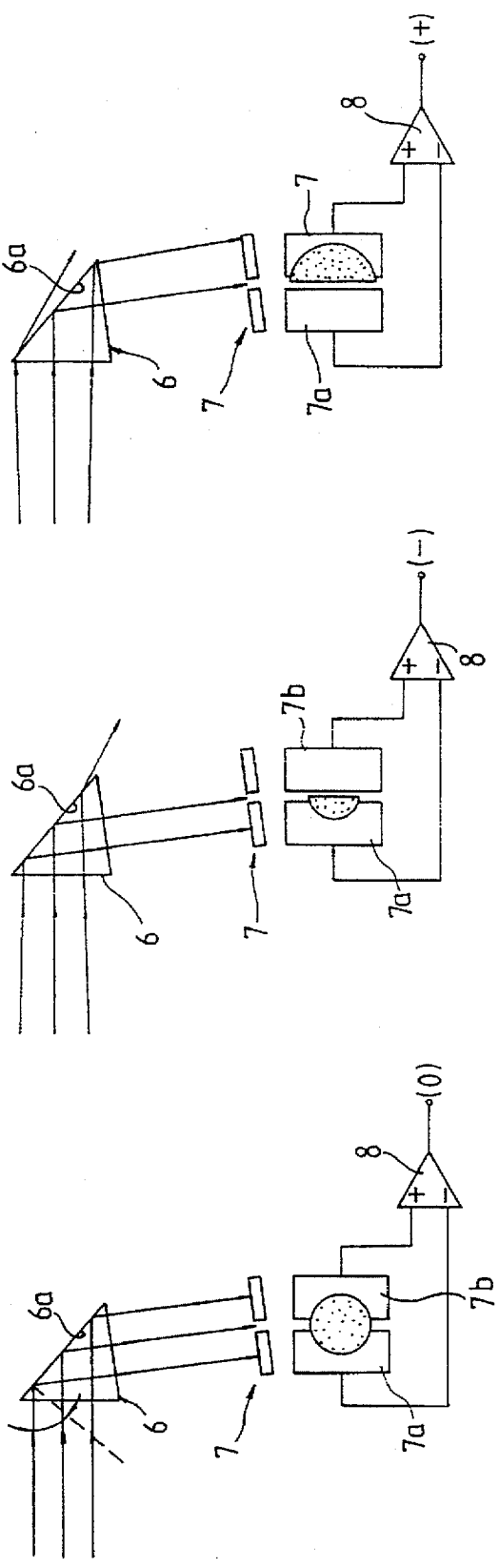
Figure 3:
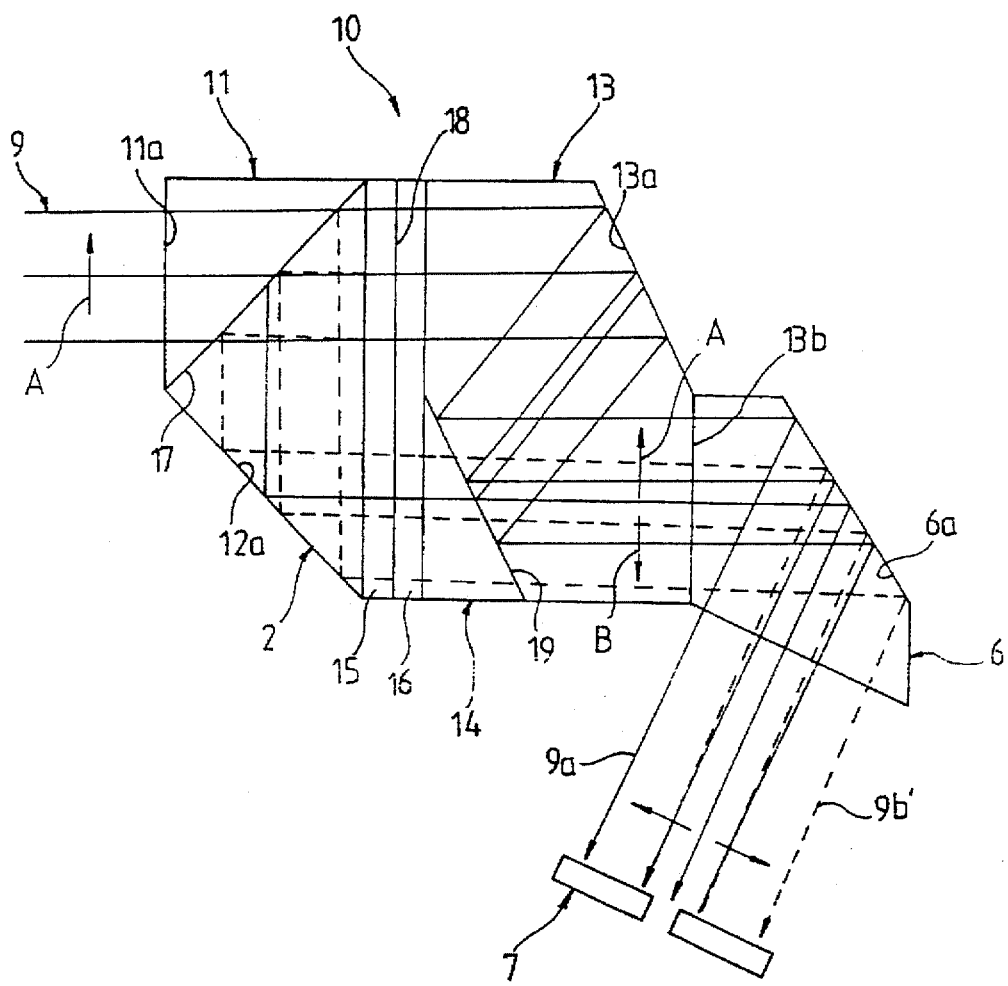
FIG. 3 is a schematic view showing the optical construction of an optical pickup adopting a focus error detector based on the critical angle method using an inverse image generator according to an embodiment of the present invention.

In FIG. 3, the inverse image generator 10 is installed in front of a critical angle prism 6, for example, in the optical system shown in FIG. 1, along the path of the reflected light reflected from the optical disk.

Also, as conventionally, there are provided a bi-segmented photo-detector 7 having two detection sections 7a and 7b so as to partially receive the reflected light from a critical reflection plane 6a of the critical angle prism 6, and a differential amplifier 8 for detecting a focus error signal therefrom.

The inverse image generator 10 according to the present invention includes a semi-transmissive plane 18 for splitting the light beam 9 reflected from an optical disk into first and second light beams 9a and 9b, first and second prisms 11 and 12 for inverting the second light beam 9b of the two to be an inverse image and third and fourth prisms 13 and 14 for synthesizing mutually inverse first and second light beams 9a and 9b, as will be described later. Here, the two front prisms 11 and 12 are coupled with each other, the two rear prisms 13 and 14 are coupled with each other, and the semi-transmissive plane 18 is provided at the halfway point of the coupling portion between two mutually overlapping wave plates 15 and 16.

Figure 4:
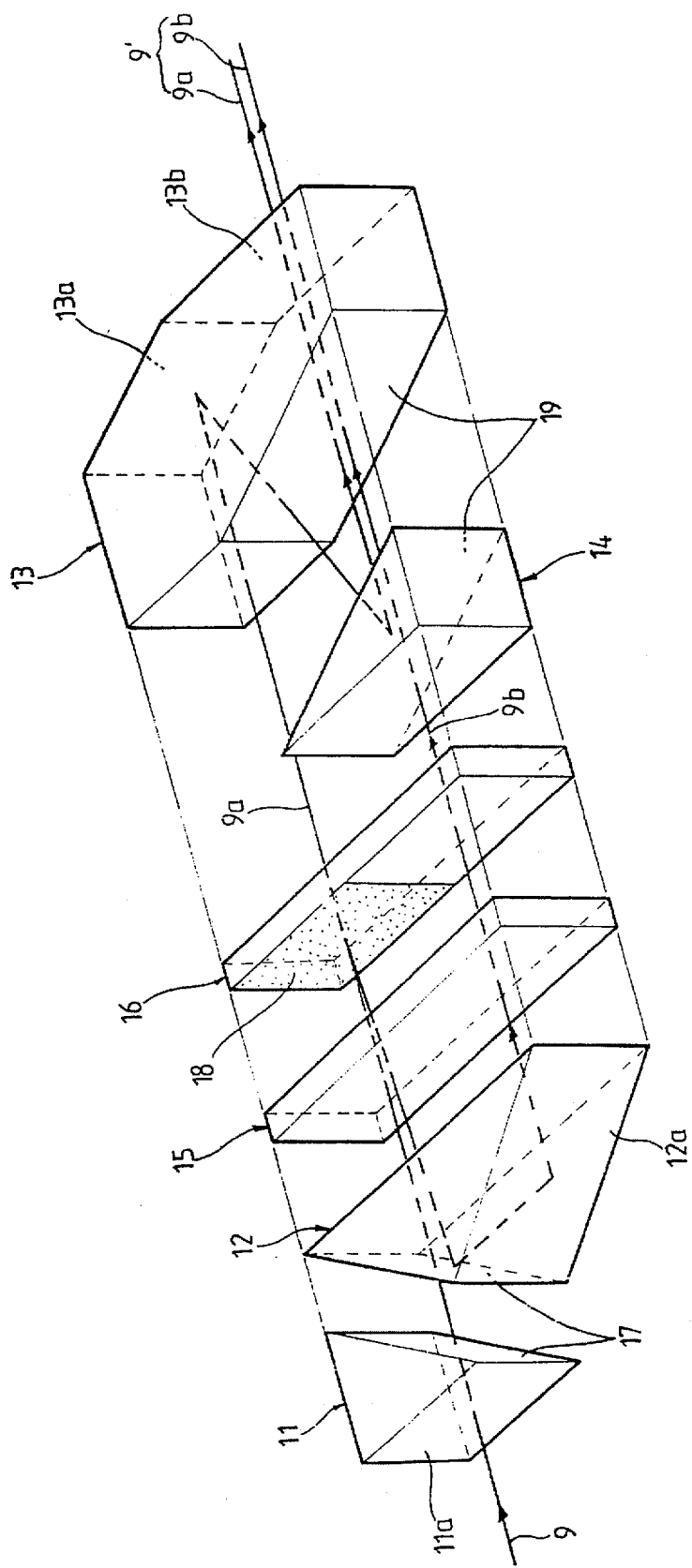
FIG. 4 is an exploded perspective view of various parts of the inverse image generator according to the present invention shown in FIG. 3.

In FIG. 4, various parts of the inverse image generator shown in FIG. 3 are in an exploded view shown, for the sake of convenient explanation. However, according to the present invention, the inverse image generator may be practically constituted such that various parts thereof are spaced apart, as shown in FIG. 4, which will now be described in more detail.

The first prism 11 has an incident plane 11a onto which the light beam 9 reflected from the optical disk is incident. The first prism 11 forms a light splitting plane 17 together with the second prism 12, which is a coupling plane of both prisms. The light splitting plane 17 makes the light beam 9 incident from the incident plane 11a of the first prism 11 travel straight ahead and reflects the second light beam 9b by 90°, which is reflected from the semi-transmissive plane 18 and then is reflected back therefrom.

The second prism 12 has a refection plane 12a for reflecting the second light beam 9b by 90° so that the second light beam 9b reflected from the light splitting plane 17 being between from the first prism 11 and second prism 12 travels along the path parallel with the first light beam 9a separated from the light beam 9. The second light beam 9b passing through the reflection plane 12a travels in parallel the first light beam 9a.

The semi-transmissive plane 18 partially transmits and reflects the incident light beam 9 to then be separated into the first and second light beams 9a and 9b, which is achieved by coating one half of the coupling portion of the first and second wave plates 15 and 16. Also, this may be achieved by inserting a separate semi-transmissive plate member. Here, the other half of the coupling portion (not labeled) of the first and second wave plates 15 and 16 is anti-reflection coated such that the second light beam 9b sequentially passing through the light splitting plane 17 and reflection plane 12a after being separated from the semi-transmissive plane 18 is transmitted straight ahead. Meanwhile, the first and second wave plates 15 and 16 are quadrant wave plates for rotating the polarization planes of light beam each passing therethough by 180°, which are provided for preventing a light loss, as will be described later.

The third prism 13 has a reflection plane 13a for receiving and reflecting the first light beam 9a passing through the second wave plate 16. The third prism 13 forms a light synthesizing plane 19 together with the fourth prism 14, which is a coupling plane of both prisms. The light synthesizing plane 19 reflects the first light beam 9a reflected from the reflection plane 13a of the third prism 13 and transmits the second light beam 9b returning to the fourth prism 14 after being separated from the semi-transmissive plane 18, as it is, to synthesize the first and second light beams 9a and 9b. Also, the third prism 13 has a radiating plane 13b for radiating the synthetic light beam 9' of the first and second light beams 9a and 9b produced by the light synthesizing plane 19. The synthetic light beam 9' of the first and second light beams 9a and 9b from the radiating plane 13b reaches the bi-segmented photo-detector 7 via the critical reflection plane 6a of the critical angle prism 6 shown in FIG. 3 and is finally detected as an electric signal by means of the bi-segmented photo-detector 7 and differential amplifier 8.

In the inverse image generator 10 according to the present invention, by properly selecting the angles of the reflection planes 12a and 13a, light splitting plane 17 and light synthesizing plane 19, the light axes of the separated first and second light beams 9a and 9b can be united to have exactly the same axis at the radiating plane 13b.

Also, in the inverse image generator 10 according to the present invention, the second light beam 9b being separated from the semi-transmissive plane 18 and then returning to the light splitting plane 17 placed between the first and second prisms 11 and 12 passes through the first wave plate 15 twice. Thus, the polarization plane of the second light beam 9b is rotated by 180° with respect to the light beam 9 travelling in the incident direction. Therefore, the light beam of the linear polarized wave is allowed to be incident onto the incident plane and the light splitting plane 17 is polarizing-coated in conformity with the polarization angle of the light beam of the incident linear polarized wave, thereby enabling to transmit the total amount of the incident light beam and totally reflecting the first light beam 9a, without any loss.

Meanwhile, since the first light beam 9a being separated from the semi-transmissive plane 18 and transmitted through the second wave plate 16 passes through the quadrant wave plate twice, its polarization plane is rotated by 180°. Also, since the second light beam 9b passing through the reflection plane 12a and transmitted through the first and second wave plates 15 and 16 passes through the quadrant wave plate twice again, its original phase is recovered. That is to say, the polarized angles of the first and second light beams 9a and 9b have a phase difference of 180° with each other. Therefore, similarly, the light synthesizing plane 19 is formed by a predetermined polarized coating, thereby enabling the total reflection of the first light beam 9a and transmitting the total amount of the second light beam 9b, without any loss.

As described above, the inverse image generator 10 according to the present invention generates a synthetic light beam 9' having two mutually inverse components being on the same axis from the light beam reflected from the optical disk. The thus generated synthetic light beam 9' is detected as a focus error signal of an objective lens with respect to the optical disk by means of the critical angle prism 6, bi-segmented photo-detector 7 and differential amplifier 8, as conventionally done, when the optical disk and objective lens are in the normal state, i.e., not being tilted or shifted.

In the state when the optical disk is positioned on the focal plane of the objective lens, if the optical axis variation is generated due to the tilt of the optical disk or shift of the objective lens, i.e., in FIG. 3, if the optical axis of the reflected light beam 9 incident onto the incident plane 11a of the inverse image generator 10 is shifted upwardly in the "A" direction, the first light beam 9a transmitted from the semi-transmissive plane 18 and radiated from the radiating plane 13b via the reflection plane 13a and light synthesizing plane 19 is also shifted upwardly in the "A" direction. On the contrary, the second light beam 12a separated and reflected from the semi-transmissive plane 18 is reflected twice from the light splitting plane 17 and reflection plane 12a, thereby being reverted in its phase, so that it is shifted downwardly in the "B" direction, which is an reverse direction to that of the first light beam 9a.

That is, the synthetic light beam 9' reaching the bi-segmented photo-detector 7 from the radiating plane 13b of the inverse image generator 10 according to the present invention via the critical reflection plane 6a of the critical angle prism 6 is formed as two spots 9a' and 9b' on the bi-segmented photo-detector 7 by the first and second light beams 9a and 9b. Since the respective spots 9a' and 9b' are mutually inverse, they are shifted by the same distance in the reverse direction to each other with respect to the optical axis variation. Here, if the light amount ratios (or light intensity) of the first and second light beams 9a and 9b are set to be the same, the signal of the differential amplifier 8 for differentiating signals of the split detection sections 7a and 7b of the bi-segmented photo-detector 7 is zero, which offsets the error due to the optical axis variation.

As described above, in detecting the focus error of the objective lens with respect to the optical disk, the inverse image generator according to the present invention can detect a stable focus error signal by eliminating errors due to the optical axis variation caused by the tilt of the optical disk or shift of the objective lens, thereby allowing a stable driving of an optical pickup.

Also, the invention can be adopted for other focus error detection based on the methods other than the critical angle method, and for optical systems for other uses, and various changes and modifications may be effected within the scope of the invention as defined in the appended claims.

What is claimed is:

1. An inverse image generating method for generating a synthetic light beam having two mutually inverse image components from a light beam, said method comprising the steps of:

splitting said light beam into first and second light beams;
inverting the phases of said first and second light beams by reflecting said separated second light beam; and
radiating said synthetic light beam by performing a process for uniting said phase-inverted second light beam with said first beam into one light axis, wherein said splitting step is performed using a semi-transmissive member for partially transmitting and reflecting said light beam, and further comprising the steps of rotating the polarization angle of said second light beam reflected from said semi-transmissive member with respect to the incident light beam, and polarization-splitting said second light beam from the incident light beam.

2. An inverse image generating method as claimed in claim 1, further comprising the step of rotating the polarization angle of said split first light beam along said phase-inverted second light beam, wherein said synthesizing step is executed by polarization-reflecting one of said first light and second light beams.

3. An inverse image generator for generating a synthetic light beam having two mutually inverse image components from a light beam, comprising:

splitting means having an incident plane onto which said light beam is incident and a radiating plane from which said synthetic light beam is radiated for splitting said light beam into first and second light beams;
inverting means for inverting phases of the first and second light beams by reflecting said separated second light beam; and
synthesizing means for synthesizing said phase-inverted second light beam with said first light beam to be said synthetic light beam by uniting them into one light axis, wherein said splitting means is made of a semi-transmissive member for partially transmitting and reflecting said light beam, further comprising polarization-splitting means for polarization-splitting said second light beam reflected from said semi-transmissive member from the incident light beam.

4. An inverse image generator as claimed in claim 3, wherein said splitting means includes a light splitting plane for transmitting said incident light beam and a quadrant wave plate installed between said light splitting plane and said semi-transmissive member.

5. An inverse image generator as claimed in claim 3, wherein said synthesizing means includes a quadrant wave plate for rotating the polarization angle of said separated first light beam along said phase-inverted second light beam and a light synthesizing plane for polarization-reflecting said first light beam passing through said quadrant wave plate and transmitting said phase-inverted second light beam.

6. An inverse image generator as claimed in claim 3, wherein said inverting means includes first and second prisms.

7. An inverse image generator as claimed in claim 3, wherein said synthesizing means includes third and fourth prisms.

8. An inverse image generator for generating a synthetic light beam having two mutually inverse image components from a light beam, comprising:

a first prism having an incident plane onto which said light beam is incident;
a semi-transmissive member for partially transmitting and reflecting the light beam passing through said first prism and splitting into first and second light beams;
a second prism coupled with said first prism to form a light splitting plane for making said light beam travel straight ahead and reflecting said second light beam, in the coupling portion therebetween, having a refection plane for reflecting said second light beam reflected from said light splitting plane again so as to travel in parallel with said first light beam;

a third prism having a reflection plane for reflecting said first light beam and a radiating plane from which said synthetic light beam is radiated; and a fourth prism coupled with said third prism, for forming a light synthesizing plane for synthesizing said first and second light beams by reflecting said first light beam reflected from the reflection plane of said third prism again and transmitting said second light beam passing through the reflection plane of said second prism.

9. An inverse image generator as claimed in claim 8, wherein said light splitting plane and light synthesizing plane are composed of a polarization plane each formed by polarization-coating the coupling portion of the respective prisms, further comprising two quadrant wave plates disposed before and after said semi-transmissive member and each being extended laterally.

10. An inverse image generator as claimed in claim 9, wherein said semi-transmissive member is provided by semi-transmissively coating one facing side of said two quadrant wave plates.

11. A focus error detecting method for detecting a signal representing a magnitude of the focus error of an objective lens with respect to an optical disk, comprising the steps of:

focusing a light beam onto said disk by means of said objective lens;

generating a synthetic light beam having two mutually inverse image components using an inverse generating method; and detecting said light beam reflected from said optical disk after being focused onto said optical disk by means of said objective lens, whereby said signal is detected from said synthetic light beam using said inverse image generating method for generating said synthetic light beam having two mutually inverse image components from said reflected light, said method further comprising the steps of: splitting said light beam into first and second light beams using a semi-transmissive member for partially transmitting and reflecting said light beam and then rotating the polarization angle of said second light beam with respect to the incident light beam, and polarization-splitting said second light beam from the incident light beam.

12. A focus error detecting method using an inverse image generating method as claimed in claim 11, further comprising the step of rotating the polarization angle of said separated first light beam along said phase-inverted second light beam, wherein said synthetic light beam is synthesized by polarization-reflecting one of said first and second light beams.

13. A focus error detecting method using an inverse image generating method as claimed in claim 11, wherein said focus error signal is detected such that said synthetic light beam is reflected onto the critical reflection plane using a critical angle prism having a critical reflection plane, the synthetic light beam reflected from the critical reflection plane is received by a bi-segmented photo-detector, and a signal of said bi-segmented photo-detector is differentiated.

14. A focus error detector for detecting a signal representing a magnitude of the focus error of an objective lens with respect to an optical disk from a light beam reflected from said optical disk after being focused onto the optical disk by means of the objective lens, said focus error detector comprising:

inverse image generating means for generating a synthetic light beam having two mutually inverse image components from the reflected light from said reflected light beam, wherein said inverse image generating means includes splitting means for splitting said light beam into first and second light beams, wherein said splitting means is made of a semi-transmissive member for partially transmitting and reflecting said light beam, polarization-splitting means for polarization-splitting said second light beam reflected from said semi-transmissive member from the incident light beam, inverting means for inverting phases of the first and second light beams by reflecting said separated second light beam at least twice, and synthesizing means for synthesizing said phase-inverted second light beam with said first light beam to be said synthetic light beam by uniting them into one light axis; and a detector for detecting said synthetic light beam.

15. A focus error detector using inverse image generating means as claimed in claim 14, wherein said polarization-splitting means includes a light splitting plane for transmitting said incident light beam and a quadrant wave plate installed between said light splitting plane and said semi-transmissive member.

16. A focus error detector using inverse image generating means as claimed in claim 14, wherein said synthesizing means includes a quadrant wave plate for rotating the polarization angle of said separated first light beam along said phase-inverted second light beam and a light synthesizing plane for polarization-reflecting said first light beam passing through said quadrant wave plate and transmitting said phase-inverted second light beam.

17. A focus error detector using inverse image generating means as claimed in claim 14, further comprising:

a critical angle prism having a critical reflection plane for reflecting said synthetic light beam at a predetermined critical angle;

a bi-segmented photo-detector for receiving the synthetic light beam reflected from said critical reflection plane; and a differential amplifier for differentiating the signal of said bi-segmented photo-detector to detect said focus error signal.

18. A focus error detector for detecting a signal representing a magnitude of the focus error of an objective lens with respect to an optical disk from a light beam reflected from said optical disk after being focused onto the optical disk by means of the objective lens, using an inverse image generating means comprising:

a first prism having an incident plane onto which said light beam is incident;

a semi-transmissive member for partially transmitting and reflecting the light beam passing through said first prism and splitting into first and second light beams;

a second prism coupled with said first prism to form a light splitting plane for making said light beam travel straight ahead and reflecting said second light beam in a coupling portion therebetween, having a refection plane for reflecting said second light beam reflected from said light splitting plane again so as to travel in parallel with said first light beam;

a third prism having a reflection plane for reflecting said first light beam and a radiating plane from which said synthetic light beam is radiated;

a fourth prism coupled with said third prism, for forming a light synthesizing plane for synthesizing said first and second light beams by reflecting said first light beam reflected from the reflection plane of said third prism again and transmitting said second light beam passing through the reflection plane of said second prism;

a critical angle prism having a critical reflection plane for reflecting the synthetic light beam radiated from a radiating plane of said third prism at a predetermined critical angle;

a bi-segmented photo-detector for receiving the synthetic light beam reflected from said critical reflection plane; and a differential amplifier for differentiating the signal of said bi-segmented photo-detector to detect said focus error signal.

19. A focus error detector using inverse image generating means as claimed in claim 18, wherein said light splitting plane and light synthesizing plane are composed of a polarization plane each formed by polarization-coating the coupling portion of the respective prisms, further comprising two quadrant wave plates disposed before and after said semi-transmissive member and each being extended laterally.

20. A focus error detector using inverse image generating means as claimed in claim 19, wherein said semi-transmissive member is provided by semi-transmissively coating one facing side of said two quadrant wave plates.

* * * * *